(12) United States Patent
Müller et al.

(10) Patent No.: US 9,228,054 B2
(45) Date of Patent: *Jan. 5, 2016

(54) METHOD FOR PRODUCING POLYETHER CARBONATE POLYOLS

(71) Applicant: Bayer Intellectual Property GmbH, Monheim (DE)

(72) Inventors: Thomas Ernst Müller, Aachen (DE); Christoph Gürtler, Köln (DE); Muhammad Afzal Subhani, Aachen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/363,962

(22) PCT Filed: Dec. 10, 2012

(86) PCT No.: PCT/EP2012/074987
§ 371 (c)(1),
(2) Date: Jun. 9, 2014

(87) PCT Pub. No.: WO2013/087583
PCT Pub. Date: Jun. 20, 2013

(65) Prior Publication Data
US 2014/0323670 A1    Oct. 30, 2014

(30) Foreign Application Priority Data

Dec. 16, 2011 (EP) .................................... 11194164

(51) Int. Cl.
| | | |
|---|---|---|
| *C08G 65/34* | (2006.01) |
| *C08G 64/34* | (2006.01) |
| *C08G 65/26* | (2006.01) |
| *C08G 64/18* | (2006.01) |
| *C08G 18/48* | (2006.01) |

(52) U.S. Cl.
CPC .............. *C08G 65/34* (2013.01); *C08G 64/183* (2013.01); *C08G 64/34* (2013.01); *C08G 65/26* (2013.01); *C08G 65/2603* (2013.01); *C08G 65/2615* (2013.01); *C08G 65/2663* (2013.01); *C08G 18/4825* (2013.01); *C08G 18/4833* (2013.01)

(58) Field of Classification Search
CPC .. C08G 64/183; C08G 64/34; C08G 65/2663; C08G 18/32; C08G 18/4825; C08G 18/4833
See application file for complete search history.

(56) References Cited

U.S. PATENT DOCUMENTS

| | | |
|---|---|---|
| 3,404,109 A | 10/1968 | Milgrom et al. |
| 3,829,505 A | 8/1974 | Herold et al. |
| 3,941,849 A | 3/1976 | Herold |
| 5,158,922 A | 10/1992 | Hinney et al. |
| 5,470,813 A | 11/1995 | Le-Khac |
| 6,713,599 B1 | 3/2004 | Hinz et al. |
| 6,780,813 B1 | 8/2004 | Hofmann et al. |
| 7,008,900 B1 | 3/2006 | Hofmann et al. |
| 8,933,192 B2 * | 1/2015 | Gurtler et al. .................. 528/421 |
| 2003/0204042 A1 | 10/2003 | Moethrath et al. |
| 2005/0027145 A1 | 2/2005 | Hofmann et al. |
| 2012/0289732 A1 | 11/2012 | Gürtler et al. |

FOREIGN PATENT DOCUMENTS

| | | |
|---|---|---|
| EP | 0222453 A2 | 5/1987 |
| EP | 700949 A2 | 3/1996 |
| EP | 743093 A1 | 11/1996 |
| EP | 761708 A2 | 3/1997 |
| EP | 1359177 A1 | 11/2003 |
| EP | 2287226 A1 | 2/2011 |
| JP | 4145123 A | 5/1992 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 7/2001 |
| WO | WO-01/80994-AI | 11/2001 |
| WO | WO-03029325 A1 | 4/2003 |
| WO | WO-2011089120 A1 | 7/2011 |

OTHER PUBLICATIONS

International Search Report for PCT/EP2012/074987 mailed Feb. 19, 2013.
Liu, Y., et al., "Synthesis, characterization and hydrolysis of an aliphatic polycarbonate by terpolymerization of cabon dioxide, propylene oxide and maleic anhydride", Polymer, vol. 47, (2006), pp. 8453-8461.
"Study on synthesis of novel polyetherester polyol", Database Caplus (Online) Chemical Abstracts Service, Accession No. 156:58806, Nov. 15, 2011.

* cited by examiner

*Primary Examiner* — Gregory Listvoyb
(74) *Attorney, Agent, or Firm* — Drinker Biddle & Reath LLP

(57) ABSTRACT

The present invention relates to a method for producing polyether carbonate polyols by way of the catalytic addition of carbon dioxide and alkylene oxides to H-functional starter compounds in the presence of double metal cyanide (DMC) catalyzer that was activated in the presence of cyclic anhydride.

14 Claims, No Drawings

METHOD FOR PRODUCING POLYETHER CARBONATE POLYOLS

CROSS-REFERENCE TO RELATED APPLICATIONS

This application is a national stage application (under 35 U.S.C. §371) of PCT/EP2012/074987, filed Dec. 10, 2012, which claims benefit of European Application No. 11194164.7, filed Dec. 16, 2011, both of which are incorporated herein by reference in their entirety.

The present invention relates to a process for preparing polyether carbonate polyols by catalytic addition of carbon dioxide and alkylene oxides onto H-functional starter substances in the presence of double metal cyanide (DMC) catalyst which has been activated in the presence of cyclic anhydride.

The preparation of polyether carbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Alkylenoxide with Organometallic Compounds; Die Makromolekulare Chemie 130, 210-220, 1969). This reaction is shown in schematic form in scheme (I), where R is an organic radical such as alkyl, alkylaryl or aryl, each of which may also contain heteroatoms, for example O, S, Si, etc., and where e and f are each integers, and where the product shown here in scheme (I) for the polyether carbonate polyol should merely be understood in such a way that blocks having the structure shown may in principle be present in the polyether carbonate polyol obtained, but the sequence, number and length of the blocks and the OH functionality of the starter may vary, and it is not restricted to the polyether carbonate polyol shown in scheme (I). This reaction (see scheme (I)) is environmentally very advantageous, since this reaction constitutes the conversion of a greenhouse gas such as $CO_2$ to a polymer. A further product formed here as an unwanted by-product is the cyclic carbonate shown in scheme (I) (for example, when R=$CH_3$, propylene carbonate).

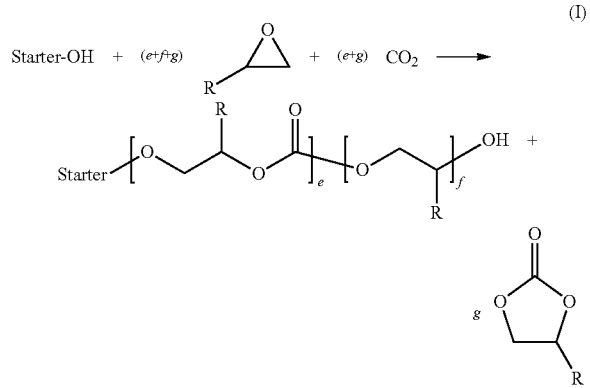

Activation in the context of this invention refers to a step in which a portion of alkylene oxide compound, optionally in the presence of $CO_2$ and/or H-functional starter compound, is added to the DMC catalyst and then the addition of the alkylene oxide compound is interrupted, and a subsequent exothermic chemical reaction causes an evolution of heat to be observed which can lead to a temperature peak ("hotspot"), and the conversion of alkylene oxide and optionally $CO_2$ can cause a pressure drop to be observed in the reactor. Optionally, the portion of the alkylene oxide compound can be added in a plurality of individual steps, in which case the occurrence of evolution of heat is generally awaited each time. The process step of activation comprises the period from commencement of the addition of the portion of alkylene oxide compound, which is optionally effected in the presence of $CO_2$, to the DMC catalyst until the end of the evolution of heat. In the case of addition of a portion of the alkylene oxide compound in a plurality of individual steps, the process step of activation comprises all the periods during which the portions of the alkylene oxide compound, optionally in the presence of $CO_2$, have been added stepwise until the end of the evolution of heat after the addition of the last portion of the alkylene oxide compound. In general, the activation step may be preceded by a step for drying the DMC catalyst and optionally the H-functional starter compound at elevated temperature and/or reduced pressure, optionally with passage of an inert gas through the reaction mixture.

EP-A 2 287 226 discloses the copolymerization of propylene oxide, maleic anhydride and carbon dioxide in the presence of double metal cyanide catalysts, where it is optionally also possible to add further monomers, for example anhydrides, to the polymerization.

Liu Y. et al., "Synthesis, characterization and hydrolysis of an aliphatic polycarbonate", POLYMER, vol. 47, 2006, pages 8453-8461 discloses the terpolymerization of propylene oxide, carbon dioxide and maleic anhydride over polymer-supported bimetallic complexes. However, H-functional starter compounds and DMC catalysts are not used.

Database Caplus (Online) Chemical Abstracts Service, Columbus, Ohio, US; 15. Nov. 2011, Dong Xu et al., "Study on synthesis of a novel polyester polyol" discloses the preparation of hydroxyl-terminated polyether ester polyols by copolymerization of propylene oxide, maleic anhydride and carbon dioxide in the presence of double metal cyanide catalysts. Dong Xu et al., however, do not disclose activation of the DMC catalyst in the presence of a cyclic anhydride.

WO-A 2011/089120 discloses the copolymerization of propylene oxide and carbon dioxide in the presence of double metal cyanide catalysts, where the double metal cyanide catalyst can be activated in a multistage process. However, the addition of anhydrides in the activation steps is not disclosed.

U.S. Pat. No. 6,713,599 B1 discloses the copolymerization of propylene oxide and carbon dioxide in the presence of double metal cyanide catalysts.

EP-A 0 222 453 discloses a process for preparing polycarbonates from alkylene oxides and carbon dioxide using a catalyst system composed of DMC catalyst and a cocatalyst such as zinc sulfate. This polymerization is initiated by contacting a portion of the alkylene oxide with the catalyst system once. Only thereafter are the residual amount of alkylene oxide and the carbon dioxide metered in simultaneously. The amount of 60% by weight of alkylene oxide compound relative to the H-functional starter compound, as specified in EP-A 0 222 453 for the activation step in examples 1 to 7, is high and has the disadvantage that this constitutes a certain safety risk for industrial scale applications because of the high exothermicity of the homopolymerization of alkylene oxide compounds.

WO-A 2003/029325 discloses a process for preparing high molecular weight aliphatic polyether carbonate polyols (weight-average molecular weight greater than 30 000 g/mol), in which a catalyst from the group consisting of zinc carboxylate and multimetal cyanide compound is used, this catalyst being anhydrous and first being contacted with at least a portion of the carbon dioxide before the alkylene oxide is added. Final $CO_2$ pressures of up to 150 bar place very high demands on the reactor and on safety. Even the excessively high pressure of 150 bar resulted in incorporation of only about 33% by weight of $CO_2$ up to a maximum of 42% by weight of $CO_2$ into the polymer. The examples detailed describe the use of a solvent (toluene) which has to be removed again by thermal means after the reaction, which leads to increased time and cost demands. Furthermore, the polymers, with a polydispersity of 2.7 or more, have a very broad molar mass distribution.

It was therefore an object of the present invention to provide a process for preparing polyether carbonate polyols which has a favorable selectivity (i.e. low ratio of cyclic carbonate to polyether carbonate polyol). In a preferred embodiment of the invention, a high content of $CO_2$ incorporated into the polymer is also to be achieved at the same time.

It has now been found that, surprisingly, the object of the invention is achieved by a process for preparing polyether carbonate polyols by catalytic addition of carbon dioxide and alkylene oxides onto one or more H-functional starter substances in the presence of double metal cyanide (DMC) catalyst, characterized in that, in a first activation stage, the DMC catalyst and at least one H-functional starter substance are initially charged and, in a second activation stage, the DMC catalyst is activated by addition of at least one alkylene oxide, $CO_2$ and at least one cyclic anhydride, and, in a third step [polymerization stage], at least one alkylene oxide and $CO_2$ are added. A preferred embodiment of the process according to the invention for preparing polyether carbonate polyols by catalytic addition of carbon dioxide and alkylene oxides onto one or more H-functional starter substances in the presence of a DMC catalyst is characterized in that ($\alpha$) the H-functional starter substance or a mixture of at least two H-functional starter substances is initially charged and any water and/or other volatile compounds are removed by elevated temperature and/or reduced pressure [first activation stage], with addition of the DMC catalyst to the H-functional starter substance or to the mixture of at least two H-functional starter substances before or after the first activation stage, ($\beta$) a portion (based on the total amount of alkylene oxides used in steps ($\beta$) and ($\gamma$)) of one or more alkylene oxides and one or more cyclic anhydrides are added to the mixture resulting from step ($\alpha$) [second activation stage], where this addition of a portion of alkylene oxide and one or more cyclic anhydrides can be effected in the presence of $CO_2$ or a mixture of $CO_2$ and inert gas (for example nitrogen or argon), and where step ($\beta$) can also be effected more than once, ($\gamma$) one or more alkylene oxides and carbon dioxide are metered constantly into the mixture resulting from step ($\beta$) [polymerization stage], where the alkylene oxides used for the copolymerization are the same as or different than the alkylene oxides used in step ($\beta$).

Step ($\alpha$):

The addition of the individual components in step ($\alpha$) can be effected simultaneously or successively in any sequence; preferably, in step ($\alpha$), DMC catalyst is first initially charged and H-functional starter compound is added simultaneously or subsequently.

A preferred embodiment provides a process wherein, in step ($\alpha$), ($\alpha$1) a reactor is initially charged with the DMC catalyst and one or more H-functional starter compounds, ($\alpha$2) an inert gas (for example nitrogen or a noble gas such as argon), an inert gas-carbon dioxide mixture or carbon dioxide is passed through the reactor at a temperature of 50 to 200° C., preferably of 80 to 160° C., more preferably of 125 to 135° C., and, at the same time, a reduced pressure (in absolute terms) of 10 mbar to 800 mbar, preferably of 40 mbar to 200 mbar, is established in the reactor by removing the inert gas or carbon dioxide (for example with a pump) [first activation stage].

A further preferred embodiment provides a process wherein, in step ($\alpha$), ($\alpha$1) the H-functional starter compound or a mixture of at least two H-functional starter compounds is initially charged, optionally under inert gas atmosphere (for example nitrogen or argon), under an atmosphere of inert gas-carbon dioxide mixture or under a pure carbon dioxide atmosphere, more preferably under inert gas atmosphere (for example nitrogen or argon) and ($\alpha$2) an inert gas (for example nitrogen or a noble gas such as argon), an inert gas-carbon dioxide mixture or carbon dioxide, more preferably inert gas (for example nitrogen or argon), is introduced into the resulting mixture of DMC catalyst and one or more H-functional starter compounds at a temperature of 50 to 200° C., preferably of 80 to 160° C., more preferably of 125 to 135° C., and, at the same time, a reduced pressure (in absolute terms) of 10 mbar to 800 mbar, preferably of 40 mbar to 200 mbar, is established in the reactor by removing the inert gas or carbon dioxide (for example with a pump) [first activation stage], where the double metal cyanide catalyst is added to the H-functional starter substance or the mixture of at least two H-functional starter substances in step ($\alpha$1) or immediately thereafter in step ($\alpha$2).

The DMC catalyst can be added in solid form or as a suspension in an H-functional starter compound. If the DMC catalyst is added as a suspension, this is preferably added in step ($\alpha$1) to the one or more H-functional starter compounds.

Step ($\beta$):

The step of the second activation stage (step ($\beta$)) can be effected in the presence of $CO_2$ and/or inert gas (for example nitrogen or argon). For example, step ($\beta$) is effected under an atmosphere of inert gas-carbon dioxide mixture (for example nitrogen-carbon dioxide mixture or argon-carbon dioxide mixture) or a carbon dioxide atmosphere, more preferably under carbon dioxide atmosphere. The establishment of an atmosphere of inert gas-carbon dioxide mixture (for example nitrogen-carbon dioxide mixture or argon-carbon dioxide mixture) or of a carbon dioxide atmosphere and the metered addition of one or more alkylene oxides can in principle be effected in different ways. The supply pressure is preferably established by introduction of carbon dioxide, where the pressure (in absolute terms) is 10 mbar to 100 bar, preferably 100 mbar to 50 bar and especially preferably 500 mbar to 50 bar. The commencement of the metered addition of the alkylene oxide can be effected from vacuum or at a previously chosen supply pressure. The total pressure (in absolute terms) of the atmosphere of inert gas-carbon dioxide mixture (for example nitrogen-carbon dioxide mixture or argon-carbon dioxide mixture) or of a carbon dioxide atmosphere and any alkylene oxide set in step ($\beta$) is preferably a range from 10 mbar to 100 bar, preferably 100 mbar to 50 bar and more preferably 500 mbar to 50 bar. Optionally, during or after the metered addition of the alkylene oxide, the pressure is readjusted by introducing further carbon dioxide, where the pressure (in absolute terms) is 10 mbar to 100 bar, preferably 100 mbar to 50 bar and more preferably 500 mbar to 50 bar.

In a preferred embodiment, the amount of one or more alkylene oxides used in the activation in step ($\beta$) is 0.1 to 25.0% by weight, preferably 1.0 to 20.0% by weight, especially preferably 2.0 to 16.0% by weight (based on the amount of starter compound used in step (α)). The alkylene oxide can be added in one step or stepwise in two or more portions.

Cyclic anhydrides and alkylene oxides are used in the activation in step (β) in molar ratios of 1:2 to 1:100, preferably 1:5 to 1:50, especially preferably in molar ratios of 1:5 to 1:25. The cyclic anhydride can be added in one step or stepwise in two or more portions. The DMC catalyst is preferably used in such an amount that the content of DMC catalyst in the resulting polyether carbonate polyol is 10 to 10 000 ppm, especially preferably 20 to 5000 ppm and most preferably 50 to 500 ppm.

In the second activation step, alkylene oxide and cyclic anhydride are added, for example, in one portion or within 1 to 15 minutes, preferably 5 to 10 minutes. The duration of the second activation step is preferably 15 to 240 minutes, more preferably 20 to 60 minutes.

Step (γ):

The metered addition of one or more alkylene oxides and the carbon dioxide can be effected simultaneously, alternately or sequentially, where the total amount of carbon dioxide can be added all at once or metered in over the reaction time. It is possible, during the addition of the alkylene oxide, to increase or lower the $CO_2$ pressure gradually or stepwise or to leave it constant. Preferably, the total pressure is kept constant during the reaction by metered addition of further carbon dioxide. The metered addition of one or more alkylene oxides and/or the $CO_2$ is effected simultaneously, alternately or sequentially with respect to the metered addition of carbon dioxide. It is possible to meter in the alkylene oxide at a constant metering rate, or to increase or lower the metering rate gradually or stepwise, or to add the alkylene oxide in portions. Preferably, the alkylene oxide is added to the reaction mixture at a constant metering rate. If a plurality of alkylene oxides are used for synthesis of the polyether carbonate polyols, the alkylene oxides can be metered in individually or as a mixture. The metered addition of the alkylene oxides can be effected simultaneously, alternatively or sequentially, each via separate metering points (addition points), or via one or more metering points, in which case the alkylene oxides can be metered in individually or as a mixture. It is possible via the manner and/or sequence of the metered addition of the alkylene oxides and/or the carbon dioxide to synthesize random, alternating, block or gradient polyether carbonate polyols.

Preferably, an excess of carbon dioxide is used, based on the calculated amount of carbon dioxide incorporated in the polyether carbonate polyol, since an excess of carbon dioxide is advantageous because of the low reactivity of carbon dioxide. The amount of carbon dioxide can be fixed via the total pressure under the respective reaction conditions. An advantageous total pressure (in absolute terms) for the copolymerization for preparation of the polyether carbonate polyols has been found to be in the range from 0.01 to 120 bar, preferably 0.1 to 110 bar, more preferably from 1 to 100 bar. It is possible to feed in the carbon dioxide continuously or discontinuously. This depends on how quickly the alkylene oxides and the $CO_2$ are consumed and whether the product is supposed to contain any $CO_2$-free polyether blocks or blocks having different $CO_2$ content. The amount of the carbon dioxide (reported as pressure) can likewise vary in the course of addition of the alkylene oxides. According to the reaction conditions selected, it is possible to introduce the $CO_2$ into the reactor in the gaseous, liquid or supercritical state. $CO_2$ can also be added to the reactor in solid form and then be converted under the selected reaction conditions to the gaseous, dissolved, liquid and/or supercritical state.

In step (γ), the carbon dioxide can be introduced into the mixture, for example, by
(i) sparging the reaction mixture in the reactor from below,
(ii) using a hollow-shaft stirrer,
(iii) combination of the metering methods as per (i) and (ii), and/or
(iv) sparging via the liquid surface by use of multilevel stirrer units.

Step (γ) is conducted, for example, at temperatures of 60 to 150° C., preferably from 80 to 120° C., most preferably from 90 to 110° C. If temperatures below 60° C. are set, the reaction ceases. At temperatures above 150° C., the amount of unwanted by-products rises significantly.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the base of the reactor and/or on the side wall of the reactor.

The hollow-shaft stirrer (also referred to as sparging stirrer) as per (ii) is preferably a stirrer in which the gas is introduced into the reaction mixture via a hollow shaft in the stirrer. The rotation of the stirrer in the reaction mixture (i.e. in the course of mixing) gives rise to a reduced pressure at the end of the stirrer paddle connected to the hollow shaft, such that the gas phase (containing $CO_2$ and any unconsumed alkylene oxide) is sucked out of the gas space above the reaction mixture and is passed through the hollow shaft of the stirrer into the reaction mixture.

The sparging of the reaction mixture as per (i), (ii), (iii) or (iv) can be effected with freshly metered-in carbon dioxide in each case (and/or be combined with suction of the gas out of the gas space above the reaction mixture and subsequent recompression of the gas. For example, the gas sucked out of the gas space above the reaction mixture and compressed, optionally mixed with fresh carbon dioxide and/or alkylene oxide, is introduced into the reaction mixture as per (i), (ii), (iii) and/or (iv). Preferably, the pressure drop which arises through incorporation of the carbon dioxide, the cyclic anhydride and the alkylene oxide into the reaction product in the copolymerization is balanced out by means of freshly metered-in carbon dioxide.

The introduction of the alkylene oxide can be effected separately or together with the $CO_2$, either via the liquid surface or directly into the liquid phase. Preferably, the alkylene oxide is introduced directly into the liquid phase, since this has the advantage of rapid mixing of the alkylene oxide introduced with the liquid phase and hence avoidance of local concentration peaks of alkylene oxide. The introduction into the liquid phase can be effected via one or more inlet tubes, one or more nozzles or one or more annular arrangements of multiple metering points, which are preferably arranged at the base of the reactor and/or at the side wall of the reactor.

The three steps (α), (β) and (γ) can be performed in the same reactor, or each can be performed separately in different reactors. Particularly preferred reactor types are stirred tanks, tubular reactors, and loop reactors. If the reaction steps (α), (β) and (γ) are performed in different reactors, a different reactor type can be used for each step.

Polyether carbonate polyols can be prepared in a stirred tank, in which case the stirred tank, according to the design and mode of operation, is cooled via the reactor shell, internal cooling surfaces and/or cooling surfaces within a pumped circulation system. Both in the semi-batchwise application, in which the product is withdrawn only after the end of the reaction, and in the continuous application, in which the product is withdrawn continuously, particular attention should be paid to the metering rate of the alkylene oxide. This should be set such that, in spite of the inhibiting action of the carbon dioxide, the alkylene oxides are depleted quickly enough. The concentration of free alkylene oxides in the reaction mixture during the second activation stage (step β) is preferably >0 to 100% by weight, especially preferably >0 to 50% by weight, most preferably >0 to 20% by weight (based in each case on the weight of the reaction mixture). The concentration of free alkylene oxides in the reaction mixture during the reaction (step γ) is preferably >0 to 40% by weight, especially preferably >0 to 25% by weight, most preferably >0 to 15% by weight (based in each case on the weight of the reaction mixture).

A further possible embodiment in a stirred tank (batch) for the copolymerization (step γ) is characterized in that one or more H-functional starter compounds are also metered continuously into the reactor during the reaction. In the case of performance of the process in semi-batchwise operation, the amount of the H-functional starter compounds which are metered continuously into the reactor during the reaction is preferably at least 20 mol % equivalents, more preferably 70 to 95 mol % equivalents (based in each case on the total amount of H-functional starter compounds). In the case of continuous performance of the process, the amount of the H-functional starter compounds which are metered continuously into the reactor during the reaction is preferably at least 80 mol % equivalents, more preferably 95 to 99.99 mol % equivalents (based in each case on the total amount of H-functional starter compounds).

In a preferred embodiment, the catalyst-starter mixture activated as per steps (α) and (β) is reacted further with alkylene oxides and carbon dioxide in the same reactor. In a further preferred embodiment, the catalyst-starter mixture activated as per steps (α) and (β) is reacted further with alkylene oxides and carbon dioxide in another reaction vessel (for example a stirred tank, tubular reactor or loop reactor). In a further preferred embodiment, the catalyst-starter mixture prepared as per step (α) is reacted with alkylene oxides, cyclic anhydrides and carbon dioxide as per steps (β) and (γ) in another reaction vessel (for example a stirred tank, tubular reactor or loop reactor).

When the reaction is conducted in a tubular reactor, the catalyst-starter mixture prepared as per step (α) or the catalyst-starter mixture activated as per steps (α) and (β) and optionally further starters and alkylene oxides, cyclic anhydrides and carbon dioxide are pumped continuously through a tube. When a catalyst-starter mixture prepared as per step (α) is used, the second activation stage as per step (β) is effected in the first part of the tubular reactor and the copolymerization as per step (γ) in the second part of the tubular reactor. The molar ratios of the co-reactants vary according to the desired polymer. In a preferred embodiment, carbon dioxide is metered in here in its liquid or supercritical form, in order to enable optimal miscibility of the components. The carbon dioxide can be introduced in the reactor at the inlet of the reactor and/or via metering points arranged along the reactor. A portion of the alkylene oxides or cyclic anhydrides can be introduced at the inlet of the reactor. The remaining amount of the alkylene oxides is preferably introduced into the reactor via a plurality of metering points arranged along the reactor. Advantageously, mixing elements for better mixing of the co-reactants are installed, as sold, for example, by Ehrfeld Mikrotechnik BTS GmbH, or mixer-heat exchanger elements which simultaneously improve the mixing and heat removal. Preferably, the mixing elements mix $CO_2$ and alkylene oxide which have been metered in with the reaction mixture. In an alternative embodiment, different volume elements of the reaction mixture are mixed with one another.

Loop reactors can likewise be used for preparation of polyether carbonate polyols. These generally include reactors having internal and/or external material recycling (optionally with heat exchange surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

In order to achieve full conversion, the reaction apparatus in which step (γ) is performed is frequently connected upstream of a further tank or a tube ("delay tube") in which residual concentrations of free alkylene oxides present after the reaction are depleted. Preferably, the pressure in this downstream reactor is at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 10 to 150° C. and more preferably 20 to 100° C. At the end of the post-reaction time or at the outlet of the downstream reactor, the reaction mixture contains preferably less than 0.05% by weight of alkylene oxide. The post-reaction time or the residence time in the downstream reactor is preferably 10 min to 24 h, especially preferably 10 min to 3 h.

The polyether carbonate polyols obtained in accordance with the invention preferably have an OH functionality (i.e. average number of OH groups per molecule) of at least 0.8, preferably of 1 to 8, more preferably of 1 to 6 and most preferably of 2 to 4. The molecular weight of the polyether carbonate polyols obtained is preferably at least 400, more preferably 400 to 1 000 000 g/mol and most preferably 500 to 60 000 g/mol.

In general, for the process according to the invention, it is possible to use alkylene oxides (epoxides) having 2-45 carbon atoms. The alkylene oxides having 2-45 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preferably, the alkylene oxides used are ethylene oxide and/or propylene oxide, especially propylene oxide.

The cyclic anhydrides used are preferably compounds of the formula (II), (III) or (IV)

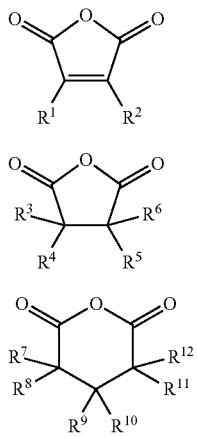

where
R1 and R2 are each hydrogen, halogen, C1-C22-alkyl, C1-C22-alkenyl or C6-C18-aryl, or R1 and R2 may each be members of a 4- to 7-membered ring or polycyclic system, R1 and R2 together preferably forming a benzene ring,
R3, R4, R5 and R6 are each hydrogen, C1-C22-alkyl, C1-C22-alkenyl or C6-C18-aryl or may each be members of a 4- to 7-membered ring or polycyclic system and
R7, R8, R9, R10, R11 and R12 are each hydrogen, C1-C22-alkyl, C1-C22-alkenyl or C6-C18-aryl or may each be members of a 4- to 7-membered ring or polycyclic system,
where the compounds of the formula (II) and (III) and (IV) may also be substituted by chlorine, bromine, nitro groups or alkoxy groups.

Cyclic anhydrides in the context of the inventions are also preferably maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride and allylnorbornenedioic anhydride.

Suitable H-functional starter compounds (starters) used may be compounds having hydrogen atoms active in respect of the alkoxylation. Groups which have active hydrogen atoms and are active in respect of the alkoxylation are, for example, —OH, —NH$_2$ (primary amines), —NH— (secondary amines), —SH and —CO$_2$H, preferably —OH and —NH$_2$, especially preferably —OH. The H-functional starter substances used are, for example, one or more compounds selected from the group consisting of mono- or polyhydric alcohols, polyfunctional amines, polyhydric thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines (for example the products called Jeffamines® from Huntsman, for example D-230, D-400, D-2000, T-403, T-3000, T-5000 or corresponding BASF products, for example Polyetheramine D230, D400, D200, T403, T5000), polytetrahydrofurans (e.g. PolyTHF® from BASF, for example PolyTHF® 250, 650S, 1000, 1000S, 1400, 1800, 2000), polytetrahydrofuranamines (BASF product Polytetrahydrofuranamine 1700), polyether thiols, polyacrylate polyols, castor oil, the mono- or diglyceride of castor oil, monoglycerides of fatty acids, chemically modified mono-, di- and/or triglycerides of fatty acids, and $C_1$-$C_{24}$-alkyl fatty acid esters containing an average of at least 2 OH groups per molecule. By way of example, the $C_1$-$C_{24}$-alkyl fatty acid esters containing an average of at least 2 OH groups per molecule are commercial products such as Lupranol Balance® (from BASF AG), Merginol® products (from Hobum Oleochemicals GmbH), Sovermol® products (from Cognis Deutschland GmbH & Co. KG) and Soyol®™ products (from USSC Co.).

The monofunctional starter compounds used may be alcohols, amines, thiols and carboxylic acids. The monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. The monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, 1,3-propanediol, 1,4-butanediol, 1,4-butenediol, 1,4-butynediol, neopentyl glycol, 1,5-pentantanediol, methylpentanediols (for example 3-methyl-1,5-pentanediol), 1,6-hexanediol; 1,8-octanediol, 1,10-decanediol, 1,12-dodecanediol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and all the modification products of these aforementioned alcohols with different amounts of ε-caprolactone.

The H-functional starter substances may also be selected from the substance class of the polyether polyols, especially those having a molecular weight $M_n$ in the range from 100 to 4000 g/mol. Preference is given to polyether polyols formed from repeating ethylene oxide and propylene oxide units, preferably having a proportion of 35 to 100% propylene oxide units, more preferably having a proportion of 50 to 100% propylene oxide units. These may be random copolymers, gradient copolymers, alternating copolymers or block copolymers of ethylene oxide and propylene oxide. Suitable polyether polyols formed from repeating propylene oxide and/or ethylene oxide units are, for example, the Desmophen®, Acclaim®, Arcol®, Baycoll®, Bayfill®, Bayflex®, Baygal®, PET and polyether polyols from Bayer MaterialScience AG (for example Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET 1004, Polyether® S180). Further suitable homo-polyethylene oxides are, for example, the Pluriol® E brands from BASF SE; suitable homo-polypropylene oxides are, for example, the Pluriol® P brands from BASF SE; suitable mixed copolymers of ethylene oxide and propylene oxide are, for example, the Pluronic® PE or Pluriol® RPE brands from BASF SE.

The H-functional starter substances may also be selected from the substance class of the polyester polyols, especially those having a molecular weight $M_n$ in the range from 200 to 4500 g/mol. The polyester polyols used are at least difunctional polyesters. Preferably, polyester polyols consist of alternating acid and alcohol units. The acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. The alcohol components used are, for example, ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol or mixtures of the alcohols mentioned. If the alcohol components used are dihydric or polyhydric polyether polyols, the result is polyester ether polyols which can likewise serve as starter substances for preparation of the polyether carbonate polyols. Preference is given to using polyether polyols with $M_n$=150 to 2000 g/mol for preparation of the polyester ether polyols.

In addition, the H-functional starter substances used may be polycarbonate diols, especially those having a molecular weight $M_n$ in the range from 150 to 4500 g/mol, preferably 500 to 2500, which are prepared, for example, by reaction of phosgene, dimethyl carbonate, diethyl carbonate or diphenyl carbonate and difunctional alcohols or polyester polyols or polyether polyols. Examples of polycarbonates can be found, for example, in EP-A 1359177. For example, the polycarbonate diols used may be the Desmophen® C products from Bayer MaterialScience AG, for example Desmophen® C. 1100 or Desmophen® C. 2200.

In a further embodiment of the invention, it is possible to use polyether carbonate polyols as H-functional starter substances. More particularly, polyether carbonate polyols obtainable by the process according to the invention described here are used. For this purpose, these polyether carbonate polyols used as H-functional starter substances are prepared in a separate reaction step beforehand.

The H-functional starter substances generally have an OH functionality (i.e. the number of hydrogen atoms active in respect of the polymerization per molecule) of 1 to 8, preferably of 2 to 6 and more preferably of 2 to 4. The H-functional starter substances are used either individually or as a mixture of at least two H-functional starter substances.

Preferred H-functional starter substances are alcohols of the general formula (V)

HO—(CH$_2$)$_x$—OH (V)

where x is a number from 1 to 20, preferably an even number from 2 to 20. Examples of alcohols of the formula (V) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols of the formula (V) with ε-caprolactone, for example reaction products of trimethylolpropane with ε-caprolactone, reaction products of glycerol with ε-caprolactone, and reaction products of pentaerythritol with ε-caprolactone. Preference is further given to using, as H-functional starter compounds, water, diethylene glycol, dipropylene glycol, castor oil, sorbitol and polyether polyols formed from repeating polyalkylene oxide units.

More preferably, the H-functional starter substances are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, where the polyether polyol has been formed from a di- or tri-H-functional starter compound and propylene oxide or a di- or tri-H-functional starter compound, propylene oxide and ethylene oxide. The polyether polyols preferably have an OH functionality of 2 to 4 and a molecular weight $M_n$ in the range from 62 to 4500 g/mol and especially a molecular weight $M_n$ in the range from 62 to 3000 g/mol.

Double metal cyanide (DMC) catalysts for use in the homopolymerization of alkylene oxides are known in principle from the prior art (see, for example, U.S. Pat. No. 3,404,109, U.S. Pat. No. 3,829,505, U.S. Pat. No. 3,941,849 and U.S. Pat. No. 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and enable the preparation of polyether carbonate polyols at very low catalyst concentrations. A typical example is that of the highly active DMC catalysts which are described in EP-A 700 949 and contain, as well as a double metal cyanide compound (e.g. zinc hexacyanocobaltate(III)) and an organic complex ligand (e.g. tert-butanol), also a polyether having a number-average molecular weight greater than 500 g/mol.

The inventive DMC catalysts are preferably obtained by
(a) in the first step reacting an aqueous solution of a metal salt with the aqueous solution of a metal cyanide salt in the presence of one or more organic complex ligands, for example of an ether or alcohol,
(b) with removal in the second step of the solid from the suspension obtained from (i) by known techniques (such as centrifugation or filtration),
(c) with optional washing in a third step of the isolated solid with an aqueous solution of an organic complex ligand (for example by resuspending and optionally reisolating by filtration or centrifugation),
(d) with subsequent drying of the solid obtained, optionally after pulverization, at temperatures of generally 20-120° C. and at pressures of generally 0.1 mbar to standard pressure (1013 mbar), and with addition, in the first step or immediately after the precipitation of the double metal cyanide compound (second step), of one or more organic complex ligands, preferably in excess (based on the double metal cyanide compound), and optionally of further complex-forming components.

The double metal cyanide compounds present in the inventive DMC catalysts are the reaction products of water-soluble metal salts and water-soluble metal cyanide salts.

For example, an aqueous solution of zinc chloride (preferably in excess based on the metal cyanide salt, for example potassium hexacyanocobaltate) and potassium hexacyanocobaltate are mixed and then dimethoxyethane (glyme) or tert-butanol (preferably in excess, based on zinc hexacyanocobaltate) is added to the suspension formed.

Metal salts suitable for preparation of the double metal cyanide compounds preferably have the general formula (VI)

$$M(X)_n \quad (VI)$$

where
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
n is 1 when X=sulfate, carbonate or oxalate and
n is 2 when X=halide, hydroxide, carboxylate, cyanate, thiocyanate, isocyanate, isothiocyanate or nitrate,
or suitable metal salts have the general formula (VII)

$$M_r(X)_3 \quad (VII)$$

where
M is selected from the metal cations $Fe^{3+}$, $Al^{3+}$, $Co^{3+}$ and $Cr^{3+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
r is 2 when X=sulfate, carbonate or oxalate and
r is 1 when X=halide, hydroxide, carboxylate, cyanate, thiocyanate, isocyanate, isothiocyanate or nitrate,
or suitable metal salts have the general formula (VIII)

$$M(X)_s \quad (VIII)$$

where
M is selected from the metal cations $Mo^{4+}$, $V^{4+}$ and $W^{4+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate and
s is 4 when X=halide, hydroxide, carboxylate, cyanate, thiocyanate, isocyanate, isothiocyanate or nitrate,
or suitable metal salts have the general formula (IX)

$$M(X)_t \quad (IX)$$

where
M is selected from the metal cations $Mo^{6+}$ and $W^{6+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (X)

$$(Y)_aM'(CN)_b(A)_c \quad (X)$$

where
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II),
Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate and nitrate, and
a, b and c are integers, where the values of a, b and c are chosen so as to give electronic neutrality of the metal cyanide salt; a is preferably 1, 2, 3 or 4; b is preferably 4, 5 or 6; c preferably has a value of 0.

Examples of suitable metal cyanide salts are sodium hexacyanocobaltate(III), potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds present in the inventive DMC catalysts are compounds of the general formula (XI)

$$M_x[M'_{x'}(CN)_y]_z \quad (XI)$$

in which M is as defined in formula (VI) to (IX) and
M' is as defined in formula (X), and
x, x', y and z are integer values and are chosen so as to give electronic neutrality of the double metal cyanide compound.
Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8 lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). For example, the organic complex ligands used are water-soluble, organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally, in the preparation of the inventive DMC catalysts, one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, $\alpha,\beta$-unsaturated carboxylic esters or ionic surface- or interface-active compounds, are used.

Preferably, in the preparation of the inventive DMC catalysts, in the first step, the aqueous solutions of the metal salt (e.g. zinc chloride), used in a stoichiometric excess (at least 50 mol %) based on metal cyanide salt, i.e. at least a molar ratio of metal salt to metal cyanide salt of 2.25:1.00), and the metal cyanide salt (e.g. potassium hexacyanocobaltate) are converted in the presence of the organic complex ligand (e.g. tert-butanol), forming a suspension comprising the double metal cyanide compound (e.g. zinc hexacyanocobaltate), water, excess metal salt, and the organic complex ligands.

This organic complex ligand may be present in the aqueous solution of the metal salt and/or of the metal cyanide salt, or it is added directly to the suspension obtained after precipitation of the double metal cyanide compound. It has been found to be advantageous to mix the aqueous solutions of the metal salt and of the metal cyanide salt, and the unsaturated by stirring vigorously. Optionally, the suspension formed in the first step is subsequently treated with a further complex-forming component. This complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the inventive catalyst) is isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the inventive catalyst. Preferably, the amount of the organic complex ligand in the aqueous wash solution is between 40 and 80% by weight, based on the overall solution.

Optionally, in the third step, further complex-forming component is added to the aqueous wash solution, preferably in the range between 0.5 and 5% by weight, based on the overall solution.

Moreover, it is advantageous to wash the isolated solid more than once. Preferably, in a first wash step (iii-1), an aqueous solution of the unsaturated alcohol is used for washing (for example by resuspension and subsequent reisolation by filtration or centrifugation), in order to remove, for example, water-soluble by-products such as potassium chloride from the inventive catalyst in this way. Especially preferably, the amount of the unsaturated alcohol in the aqueous wash solution is between 40 and 80% by weight, based on the overall solution in the first wash step. In the further wash steps (iii-2), either the first wash step is repeated once or more than once, preferably once to three times, or, preferably, a non-aqueous solution, for example a mixture or solution of unsaturated alcohol and further complex-forming components (preferably in the range between 0.5 and 5% by weight, based on the total amount of the wash solution in step (iii-2)), is used as a wash solution to wash the solid once or more than once, preferably once to three times.

The isolated and optionally washed solid is subsequently, optionally after pulverization, dried at temperatures of generally 20-100° C. and at pressures of generally 0.1 mbar to standard pressure (1013 mbar).

A preferred process for isolating the inventive DMC catalysts from the suspension by filtration, filtercake washing and drying is described in WO-A 01/80994.

The polyether carbonate polyols obtainable by the process according to the invention can be processed without difficulty, especially by reaction with di- and/or polyisocyanates to give polyurethanes, especially to give flexible polyurethane foams, rigid polyurethane foams, polyurethane elastomers or polyurethane coatings. For polyurethane applications, it is preferable to use polyether carbonate polyols based on an H-functional starter compound having a functionality of at least 2. In addition, the polyether carbonate polyols obtainable by the process according to the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyether carbonate polyols to be used have to fulfill certain material properties, for example molecular weight, viscosity, functionality and/or hydroxyl number.

EXAMPLES

H-Functional Starter Substance (Starter) Used:
PET-1 difunctional poly(oxypropylene)polyol having an OH number of 112 $mg_{KOH}/g$
Epoxides Used:
PO propylene oxide
Anhydrides Used:
MA maleic anhydride The DMC catalyst was prepared according to example 6 of WO-A 01/80994.

The polymerization reactions were conducted in a 300 ml Parr pressure reactor. The pressure reactor used in the examples had a height (internal) of 10.16 cm and an internal diameter of 6.35 cm. The reactor was equipped with an electrical heating jacket (maximum heating power 510 watts). The counter-cooling consisted in an immersed tube of external diameter 6 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which projected into the reactor up to 3 mm above the base.

The heating power of the electrical heating jacket during the activation [first activation stage] averaged about 20% of the maximum heating power. As a result of the regulation, the heating power varied by ±5% of the maximum heating power. The occurrence of elevated evolution of heat in the reactor, caused by the rapid conversion of propylene oxide during the activation of the catalyst [second activation stage], was observed via a reduced heat output of the heating jacket, the counter-cooling being switched on and in some cases a temperature rise in the reactor. The occurrence of evolution of heat in the reactor, caused by the continuous conversion of propylene oxide during the reaction [polymerization stage], led to lowering of the output of the heating jacket to about 8% of the maximum heating power. As a result of the regulation, the heating power varied by ±5% of the maximum heating power.

The sparging stirrer used in the examples was a hollow shaft stirrer in which the gas was introduced into the reaction mixture via a hollow shaft in the stirrer. The stirrer body mounted on the hollow shaft had four arms and had a diameter of 35 mm and a height of 14 mm. At each end of the arm were mounted two gas outlets which had a diameter of 3 mm. The rotation of the stirrer gave rise to a reduced pressure such that the gas present above the reaction mixture ($CO_2$ and possibly alkylene oxide) was sucked in and introduced through the hollow shaft of the stirrer into the reaction mixture. The abbreviation rpm refers to the number of revolutions of the stirrer per minute.

The copolymerization of propylene oxide and $CO_2$ resulted not only in the cyclic propylene carbonate but also in the polyether carbonate polyol containing firstly polycarbonate units shown in formula (XIIa)

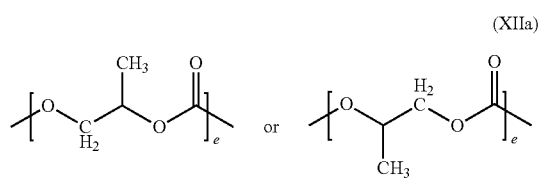

and secondly polyether units shown in formula (XIIb)

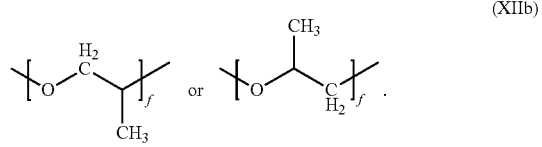

The reaction mixture was characterized by $^1$H NMR spectroscopy and gel permeation chromatography.

The ratio of the amount of cyclic propylene carbonate to polyether carbonate polyol (selectivity; g/e ratio) and the proportion of unconverted monomers (propylene oxide $R_{PO}$ in mol %) were determined by means of $^1$H NMR spectroscopy. For this purpose, a sample of each reaction mixture obtained after the reaction was dissolved in deuterated chloroform and analyzed on a Bruker spectrometer (AV400, 400 MHz).

Subsequently, the reaction mixture was diluted with dichloromethane (20 ml) and the solution was passed through a falling-film evaporator. The solution (0.1 kg in 3 h) ran downwards along the inner wall of a tube of diameter 70 mm and length 200 mm which had been heated externally to 120° C., in the course of which the reaction mixture was distributed homogeneously as a thin film on the inner wall of the falling-film evaporator in each case by three rollers of diameter 10 mm rotating at a speed of 250 rpm. Within the tube, a pump was used to set a pressure of 3 mbar. The reaction mixture which had been purified to free it of volatile constituents (unconverted epoxides, cyclic carbonate, solvent) was collected in a receiver at the lower end of the heated tube.

The molar ratio of carbonate groups to ether groups in the polyether carbonate polyol (e/f ratio) was determined by means of $^1$H NMR spectroscopy. For this purpose, a sample of each purified reaction mixture was dissolved in deuterated chloroform and analyzed on a Bruker spectrometer (AV400, 400 MHz).

The relevant resonances in the $^1$H NMR spectrum (relative to TMS=0 ppm), which were used for integration, are as follows:

I1: 1.10-1.17: methyl group of the polyether units, resonance area corresponds to three hydrogen atoms I2: 1.25-1.34: methyl group of the polycarbonate units, resonance area corresponds to three hydrogen atoms I3: 1.45-1.48: methyl group of the cyclic carbonate, resonance area corresponds to three hydrogen atoms I4: 2.95-3.00: CH group for free, unreacted propylene oxide, resonance area corresponds to one hydrogen atom The figures reported are the molar ratio of the amount of cyclic propylene carbonate to carbonate units in the polyether carbonate polyol (selectivity g/e) and the molar ratio of carbonate groups to ether groups in the polyether carbonate polyol (e/f), and also the proportions of unconverted propylene oxide (in mol %) and maleic anhydride (in mol %).

Taking account of the relative intensities, the values were calculated as follows:

Molar ratio of the amount of cyclic propylene carbonate to carbonate units in the polyether carbonate polyol (selectivity g/e):

$$g/e = I3/I2 \qquad (XIII)$$

Molar ratio of carbonate groups to ether groups in the polyether carbonate polyol (e/f):

$$e/f = I2/I1 \qquad (XIV)$$

The proportion of carbonate units in the repeat units of the polyether carbonate polyol:

$$A_{carbonate} = [(I2/3)/((I1/3)+(I2/3)+(I5/2)))] \times 100\% \qquad (XV)$$

The molar proportion of the unconverted propylene oxide ($R_{PO}$ in mol %) based on the sum total of the amount of propylene oxide used in the activation and the copolymerization, calculated by the formula:

$$R_{PO} = [I4/((I1/3)+(I2/3)+(I3/3)+I4))] \times 100\% \qquad (XVI)$$

The number-average molecular weight $M_n$ and the weight-average molecular weight $M_w$ of the polyether carbonate polyols formed were determined by means of gel permeation chromatography (GPC). The procedure of DIN 55672-1 was followed: "Gel permeation chromatography, Part 1—Tetrahydrofuran as eluent" (SECurity GPC System from PSS Polymer Service, flow rate 1.0 ml/min; columns: 2×PSS SDV linear M, 8×300 mm, 5 µm; RID detector). Polystyrene samples of known molar mass were used for calibration. The polydispersity was calculated as the ratio $M_w/M_n$.

The OH number (hydroxyl number) was determined on the basis of DIN 53240-2, except using N-methylpyrrolidone rather than THF/dichloromethane as the solvent. A 0.5 molar ethanolic KOH solution was used for titration (endpoint recognition by means of potentiometry). The test substance used was castor oil with certified OH number. The reporting of the unit in "$mg_{KOH}/g$" relates to mg [KOH]/g[polyether carbonate polyol].

Comparative Example 1

Copolymerization of Propylene Oxide and $CO_2$, Activation without Anhydride

A 300 ml pressure reactor equipped with a sparging stirrer was initially charged with a mixture of DMC catalyst (16 mg) and PET-1 (20 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of propylene oxide were metered in with the aid of an HPLC pump (1 ml/min). The reaction mixture was stirred (800 rpm) at 130° C. for 20 min. The addition of 2.0 g of propylene oxide was repeated for a second time and a third time [second activation stage]. After cooling to 100° C., a further 54.0 g of propylene oxide were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture was free of propylene oxide.

The selectivity g/e was 0.09.

The selectivity e/f was 0.26. This corresponds to a proportion of carbonate units in 20.7% of the repeat units of the polyether carbonate polyol ($A_{carbonate}$).

The molar mass $M_n$ was 5495 g/mol with a polydispersity of 1.4.

The OH number was 26.2 $mg_{KOH}/g$.

Comparative Example 2

Copolymerization of Propylene Oxide and $CO_2$, Activation in the Presence of Maleic Anhydride Only During the First Activation Stage A 300 ml pressure reactor equipped with a sparging stirrer was initially charged with a mixture of DMC catalyst (16 mg), PET-1 (20 g) and maleic anhydride (1.6 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of propylene oxide were metered in with the aid of an HPLC pump (1 ml/min). The reaction mixture was stirred (800 rpm) at 130° C. for 20 min. The addition of 2.0 g of propylene oxide was repeated for a second time and a third time [second activation stage]. After cooling to 100° C., a further 52.4 g of propylene oxide were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture contained 29% of unreacted propylene oxide. The resulting mixture was free of maleic anhydride.

The selectivity g/e was 0.30.

The selectivity e/f was 0.21. This corresponds to a proportion of carbonate units in 17.3% of the repeat units of the polyether carbonate polyol ($A_{carbonate}$).

The incorporation of the maleic anhydride resulted in double bonds in 1.29% of the repeat units of the polyether carbonate polyol ($A_{double\ bond}$).

The molar mass $M_n$ was 3092 g/mol with a polydispersity of 2.9.

The OH number was 44.5 $mg_{KOH}/g$.

Example 3

Copolymerization of Propylene Oxide and $CO_2$, Activation with Addition of Maleic Anhydride Only During the Second Activation Stage A 300 ml pressure reactor equipped with a sparging stirrer was initially charged with a mixture of DMC catalyst (16 mg) and PET-1 (20 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of a monomer mixture (26.2% by weight of maleic anhydride [corresponding to 16.6 mol %] dissolved in propylene oxide) were metered in with the aid of an HPLC pump (1 ml/min) The reaction mixture was stirred (800 rpm) at 130° C. for 20 min. The addition of 2.0 g of a monomer mixture was repeated for a second time and a third time [second activation stage]. After cooling to 100° C., a further 54.0 g of propylene oxide were metered in using an HPLC pump (1 ml/min), in the course of which the $CO_2$ pressure was kept constant at 15 bar. Subsequently, the reaction mixture was stirred at 100° C. for a further 2 h [polymerization stage]. The reaction was stopped by cooling the reactor with ice-water.

The resulting mixture was free of the propylene oxide and maleic anhydride monomers used.

The selectivity g/e was 0.06.

The selectivity e/f was 0.28. This corresponds to a proportion of carbonate units in 22.1% of the repeat units of the polyether carbonate polyol ($A_{carbonate}$).

The incorporation of the maleic anhydride resulted in double bonds in 1.63% of the repeat units of the polyether carbonate polyol ($A_{double\ bond}$).

The molar mass $M_n$ was 4646 g/mol with a polydispersity of 1.4.

The OH number was 26.1 $mg_{KOH}/g$.

TABLE 1

Overview of the results of examples/comparative examples 1 to 3

| Example | First activation stage (step α) | Second activation stage (step β) | Polymerization stage (step γ) | g/e | e/f |
|---|---|---|---|---|---|
| 1 (comp.) | without MA | without MA | without MA | 0.09 | 0.26 |
| 2 (comp.) | with MA | without MA | without MA | 0.30 | 0.21 |
| 3 | without MA | with MA | without MA | 0.06 | 0.28 | comp.: comparative example

The results of the experiments adduced in table 1 demonstrate that, in the case of addition of cyclic anhydrides in the second activation stage (example 3), the proportion of cyclic carbonate in the resulting product mixture is suppressed and, at the same time, the proportion of carbon dioxide incorporated into the polymer is increased, compared to the corresponding copolymerization of alkylene oxide and carbon dioxide in the absence of a cyclic carbonate (comparative example 1), or compared to an addition of cyclic anhydrides only in the first activation stage (comparative example 2).

Example 4

Reaction of Propylene Oxide and $CO_2$ with Addition of Maleic Anhydride Only During the Second Activation Stage and Termination of the Reaction after the Second Activation Stage A 300 ml pressure reactor equipped with a sparging stirrer was initially charged with a mixture of DMC catalyst (16 mg) and PET-1 (20 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of a monomer mixture (26.2% by weight of maleic anhydride [corresponding to 16.6 mol %] dissolved in propylene oxide) were metered in with the aid of an HPLC pump (1 ml/min) The reaction mixture was stirred (800 rpm) at 130° C. for 20 min. The addition of 2.0 g of a monomer mixture was repeated for a second time and a third time [second activation stage]. The reaction was stopped by cooling the reactor with ice-water.

The resulting mixture was free of the propylene oxide and maleic anhydride monomers used.

The selectivity g/e was 0.08.

The selectivity e/f was 0.08. This corresponds to a proportion of carbonate units in 7.3% of the repeat units of the polyether carbonate polyol ($A_{carbonate}$).

The incorporation of the maleic anhydride resulted in double bonds in 3.43% of the repeat units of the polyether carbonate polyol ($A_{double\ bond}$).

The molar mass was 1907 g/mol with a polydispersity of 1.1.

The OH number was 87.0 $mg_{KOH}/g$.

Comparative Example 5

Reaction of Propylene Oxide and $CO_2$ without Addition of Maleic Anhydride and Termination of the Reaction after the Second Activation Stage A 300 ml pressure reactor equipped with a sparging stirrer was initially charged with a mixture of DMC catalyst (16 mg) and PET-1 (20 g), and the mixture was stirred at 130° C. in a partial vacuum (50 mbar) while passing argon through the reaction mixture for 30 min [first activation stage]. After injection of $CO_2$ to 15 bar, in the course of which a slight drop in temperature was observed, and re-attainment of a temperature of 130° C., 2.0 g of propylene oxide were metered in with the aid of an HPLC pump (1 ml/min). The reaction mixture was stirred (800 rpm) at 130° C. for 20 min. The addition of 2.0 g of propylene oxide was repeated for a second time and a third time [second activation stage]. The reaction was stopped by cooling the reactor with ice-water.

The resulting mixture was free of propylene oxide.

The selectivity g/e was 0.36.

The selectivity e/f was 0.02. This corresponds to a proportion of carbonate units in 1.9% of the repeat units of the polyether carbonate polyol ($A_{carbonate}$).

The incorporation of the maleic anhydride resulted in double bonds in 2.7% of the repeat units of the polyether carbonate polyol ($A_{double\ bond}$).

The molar mass was 1608 g/mol with a polydispersity of 1.1.

The OH number was 101.0 $mg_{KOH}/g$.

TABLE 3

Overview of the results of examples 8 to 9

| Example | First activation stage (step α) | Second activation stage (step β) | g/e | e/f |
|---|---|---|---|---|
| 4 | without MA | with MA | 0.08 | 0.08 |
| 5 (comp.) | without MA | without MA | 0.36 | 0.02 | comp.: comparative example

A comparison of example 4 with comparative example 5 shows that an addition of maleic anhydride during the second activation stage brings about a particularly distinct increase in the ratio of cyclic carbonate to linear carbonate (lower ratio g/e). Equally, the $CO_2$ incorporation into the polymer is also improved (increased ratio e/f).

The invention claimed is:

1. A process for preparing a polyether carbonate polyol by catalytic addition of carbon dioxide and alkylene oxides onto one or more H-functional starter substances in the presence of double metal cyanide (DMC) catalyst, comprising,
    initially charging, in a first activation stage, the DMC catalyst and at least one H-functional starter substance and,
    activating, in a second activation stage, the DMC catalyst by addition of at least one alkylene oxide, $CO_2$ and at least one cyclic anhydride, and,
    adding, in a third step [polymerization stage], at least one alkylene oxide and $CO_2$.

2. The process as claimed in claim 1, wherein
    (α) the H-functional starter substance or a mixture of at least two H-functional starter substances is initially charged [first activation stage], with addition of the DMC catalyst to the H-functional starter substance or to the mixture of at least two H-functional starter substances before or after the first activation stage,
    (β) a portion (based on the total amount of alkylene oxides used in steps (β) and (γ)) of one or more alkylene oxides, $CO_2$ and one or more cyclic anhydrides is added to the mixture resulting from step (α) [second activation stage], and
    (γ) one or more alkylene oxides and carbon dioxide are metered constantly into the mixture resulting from step (β) [polymerization stage], where the alkylene oxides used for the copolymerization are the same as or different than the alkylene oxides used in step (β).

3. The process as claimed in claim 1, wherein
    (α) the H-functional starter substance or a mixture of at least two H-functional starter substances is initially charged [first activation stage], with addition of the DMC catalyst to the H-functional starter substance or to the mixture of at least two H-functional starter substances before or after the first activation stage, (β) a portion (based on the total amount of alkylene oxides used in steps (β) and (γ)) of one or more alkylene oxides and of one or more cyclic anhydrides are added to the mixture resulting from step (α) [second activation stage], where this addition of a portion of alkylene oxide and one or more cyclic anhydrides is effected in the presence of $CO_2$ and/or a mixture of $CO_2$ and inert gas, (γ) one or more alkylene oxides and carbon dioxide are metered constantly into the mixture resulting from step (β) [polymerization stage], where the alkylene oxides used for the copolymerization are the same as or different than the alkylene oxides used in step (β).

4. The process as claimed in claim 3, wherein, in step (α),
(α1) a reactor is initially charged with the DMC catalyst and one or more H-functional starter substances,
(α2) an inert gas, an inert gas-carbon dioxide mixture or carbon dioxide is passed through the reactor at a temperature of 50 to 200° C. and, at the same time, a reduced pressure (in absolute terms) of 10 mbar to 800 mbar is established in the reactor by removing the inert gas or carbon dioxide [first activation stage].

5. The process as claimed in claim 4, wherein the double metal cyanide catalyst is added to the H-functional starter substance or the mixture of at least two H-functional starter substances in step (α1) or immediately thereafter in step (α2).

6. The process as claimed in claim 2, wherein, in step (γ), the carbon dioxide is introduced into the mixture by
(i) sparging the reaction mixture in the reactor from below,
(ii) using a hollow-shaft stirrer,
(iii) combination of the metering methods as per (i) and (ii), and/or
(iv) sparging via the liquid surface by use of multilevel stirrer units.

7. The process as claimed in claim 2, wherein, in steps (β) and/or (γ), the carbon dioxide is introduced into the mixture by sparging the reaction mixture in the reactor from below using an inlet tube, using a sparging ring or using a combination of inlet tube or sparging ring with a gas-distributing stirrer.

8. The process as claimed in claim 2, wherein the polymerization stage (γ) is conducted in a stirred tank, tubular reactor or loop reactor.

9. The process as claimed in claim 1, wherein the cyclic anhydride used is at least one compound of the formula (II), (III) or (IV)

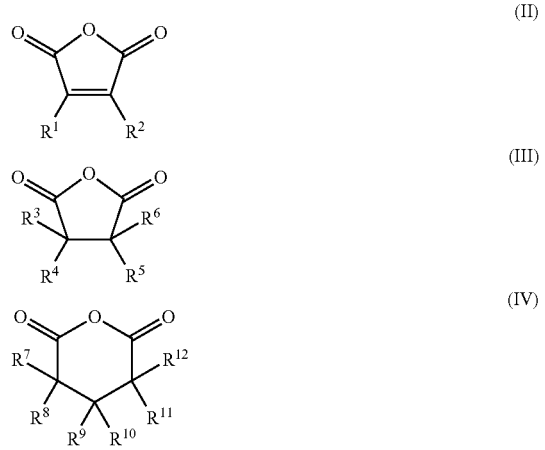

where
R1 and R2 are each hydrogen, halogen, C1-C22-alkyl, C1-C22-alkenyl or C6-C18-aryl, or R1 and R2 are members of a 4- to 7-membered ring or polycyclic system,
R3, R4, R5 and R6 are each hydrogen, C1-C22-alkyl, C1-C22-alkenyl or C6-C18-aryl or are members of a 4- to 7-membered ring or polycyclic system and
R7, R8, R9, R10, R11 and R12 are each hydrogen, C1-C22-alkyl, C1-C22-alkenyl or C6-C18-aryl or are members of a 4- to 7-membered ring or polycyclic system.

10. The process as claimed in claim 1, wherein the cyclic anhydride used is at least one compound selected from the group consisting of maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride and allylnorbornenedioic anhydride.

11. The process as claimed in claim 1, wherein the H-functional starter substance is selected from at least one of the group consisting of alcohols, amines, thiols, amino alcohols, thio alcohols, hydroxy esters, polyether polyols, polyester polyols, polyester ether polyols, polycarbonate polyols, polyether carbonate polyols, polyethyleneimines, polyetheramines, polytetrahydrofurans, polyether thiols, polyacrylate polyols, castor oil, the mono- or diglyceride of castor oil, monoglycerides of fatty acids, chemically modified mono-, di- and/or triglycerides of fatty acids and $C_1$-$C_{24}$-alkyl fatty acid esters containing an average of at least 2 OH groups per molecule.

12. The process as claimed in claim 1, wherein the H-functional starter substance is selected from at least one of the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, di- and trifunctional polyether polyols, where the polyether polyol has been formed from a di- or tri-H-functional starter substance and propylene oxide or a di- or tri-H-functional starter substance, propylene oxide and ethylene oxide and the polyether polyols have a molecular weight $M^n$ in the range from 62 to 4500 g/mol and a functionality of 2 to 3.

13. The process as claimed in claim 1, wherein the double metal cyanide catalyst comprises at least one double cyanide compound selected from the group consisting of zinc hexacyanocobaltate(III), zinc hexacyanoiridate(III), zinc hexacyanoferrate(III) and cobalt(II) hexacyanocobaltate(III).

14. The process as claimed in claim 1, wherein the double metal cyanide catalyst additionally comprises at least one organic complex ligand selected from the group consisting of aliphatic ether, ethanol, isopropanol, n-butanol, isobutanol, sec-butanol, tert-butanol, 2-methyl-3-buten-2-ol, 2-methyl-3-butyn-2-ol, ethylene glycol mono-tert-butyl ether, diethylene glycol mono-tert-butyl ether, tripropylene glycol monomethyl ether and 3-methyl-3-oxetanemethanol.

* * * * *